United States Patent [19]
Zur et al.

[11] Patent Number: 6,091,325
[45] Date of Patent: Jul. 18, 2000

[54] DEVICE AND METHOD FOR WARNING OF VEHICLE BATTERY DETERIORATION

[75] Inventors: Amos Zur, Petach Tikva; Yacob Yaffe, Yehud, both of Israel

[73] Assignee: Battery Alert Ltd., Yavne, Israel

[21] Appl. No.: 09/404,832

[22] Filed: Sep. 24, 1999

[51] Int. Cl.$^7$ .................................................. B60Q 1/00
[52] U.S. Cl. ........................ 340/455; 340/438; 340/660; 340/661; 324/433
[58] Field of Search ................................. 340/635, 636, 340/438, 309.15, 660, 661, 455; 324/384, 433

[56] References Cited

U.S. PATENT DOCUMENTS

| | | | |
|---|---|---|---|
| 3,997,888 | 12/1976 | Kremer | 340/636 |
| 4,193,006 | 3/1980 | Kabat et al. | 307/117 |
| 4,237,412 | 12/1980 | Rundlof | 322/28 |
| 4,943,777 | 7/1990 | Nakamura et al. | 324/433 |
| 5,339,017 | 8/1994 | Yang | 320/13 |
| 5,818,333 | 10/1998 | Yaffe et al. | 340/455 |

*Primary Examiner*—Julie Lieu
*Attorney, Agent, or Firm*—Mark M. Friedman

[57] ABSTRACT

An improved device and corresponding method for warning of deterioration of a starter mechanism in which a motor is powered by a battery to start a combustion engine, prior to failure of the starter mechanism to enable starting of the engine. Featuring the addition of at least one noise and/or vibration sensor, at least one corresponding noise and/or vibration level tester, a logic circuit, and a delay mechanism, to a device and method including a timer responsive to activation of the starter mechanism to time a given time interval, a voltage level tester for measuring a voltage across the battery at the end of the given time interval, a counter for performing an incremental count of occasions on which the voltage is below a given level, and an alarm unit for providing a warning signal when the incremental count is greater than a given number. The logic circuit causes activation of the alarm unit to provide an additional warning signal of starter mechanism deterioration following engine turn-off, upon fulfillment of an 'AND' logic operation by receiving (i) a first signal from the noise and/or vibration level tester less than a pre-determined threshold level indicating engine turn-off, and (ii) a delayed second signal from the counter that the incremental count is greater than the given number indicating sudden drop in battery voltage less than the given level following the given time interval. The delay mechanism enables proper synchronization of activation of the logic circuit and the alarm unit. A simpler embodiment has no counter, but includes a latch circuit for registering, storing, and sending to the logic circuit the delayed second signal of drop in battery voltage from the timer.

20 Claims, 3 Drawing Sheets

DEVICE AND METHOD FOR WARNING OF VEHICLE BATTERY DETERIORATION

FIELD AND BACKGROUND OF THE INVENTION

The present invention relates to monitoring of electrical components and, in particular, it relates to an improved device and a corresponding method for warning of deterioration of a starter mechanism of a combustion engine.

Operation of a combustion engine ordinarily involves activating a starter mechanism. In general, a combustion engine refers to any engine operating by combustion or burning of fuel in the presence of a supply of oxidation. A combustion engine may be part of a vehicle, where a vehicle may be any mobile device powered by the combustion engine for carrying or transporting persons or objects of any kind, for example, an automobile, truck, farm vehicle such as a tractor or cotton combine, train, airplane, or boat. A combustion engine may also be part of a stand alone, generally immobile, device, such as an electrical generator, cement mixer, or heavy duty power machinery. A starter mechanism of a combustion engine typically features a multitude of electrical and mechanical elements, including the basic elements of a battery as an initial source of electrical power, a starter motor for mechanically meshing with and turning the crankshaft of the engine motor, the engine motor crankshaft, a coil for generating high voltage required for continuous operation of the engine, and a myriad of related electrical and mechanical circuitry and connections among the various elements of the starter mechanism and related elements of the engine. In principle, a starter mechanism of a combustion engine operates in relation to an electrically and mechanically varying load, where the load features a varying combination of electrical and mechanical loads.

It is known that a vehicle battery, for any vehicle as described above, such as that used to activate or energize a starter mechanism for starting the motor of a combustion engine, has a limited life-span and must eventually be replaced. Typically, battery replacement is only performed once the battery is no longer able to start the engine. This situation may arise when a vehicle operator is in a hurry to drive somewhere, during rain and/or cold weather, at holiday times when garages are usually closed, or when one is a long distance from help. Battery failure is therefore a common source of aggravation for many vehicle operators on a daily basis.

A number of methods have been proposed to identify when a battery may fail to sufficiently activate or energize a starter motor and thus fail to enable starting of the vehicle engine. One method is to measure the specific gravity of the electrolyte within a battery. This procedure is ordinarily done by a professional or trained auto mechanic, since hazardous chemicals are involved during such a measurement. Another method involves measuring the internal resistance of a battery by using one of various procedures. This method also requires technical/professional knowledge and/or workers. Yet another method involves continuous measurement and display of battery voltage during the entire life of the battery.

An example of a system based on measuring internal resistance of a battery is disclosed in U.S. Pat. No. 5,339,017 to Yang which describes a device for checking the charge state of a vehicle battery. This device checks battery charge by indirectly measuring internal resistance of the battery. This is done by measuring voltage of a capacitor charged by a vehicle battery. Measurement is performed at a pre-determined time. At higher capacitor voltage, internal resistance of the battery is lower. The device provides visual display of capacitor voltage, thereby indicating battery internal resistance, which in turn shows the state of charge of the battery. Measuring internal resistance of a battery typically results in high consumption of energy and heating of the battery, potentially causing sparks leading to an engine fire or other damage if done by an improperly trained person.

To overcome limitations associated with the above described methods, Yaffe et al., in U.S. Pat. No. 5,818,333, which is incorporated by reference for all purposes as if fully set forth herein, disclosed a device and method for warning when a vehicle battery is about to run out, but is still able to start a vehicle motor, thereby allowing a vehicle operator to continue driving the vehicle, and prepare for timely replacement of the battery. The disclosed device 10, shown as a block diagram in FIG. 1, includes (a) a voltage level tester 11 for measuring, either directly or indirectly, a voltage across battery terminals 8 and 9 at the end of a given engine starting time interval, (b) a timer 12 responsive to activation of a starter mechanism to time the given engine starting time interval, (c) a counter 15 for maintaining a cumulative or incremental count of occasions on which the battery voltage is below a given level, and (d) an alarm unit 16 for providing a warning signal when the cumulative or incremental count exceeds a pre-determined number of counts. In a preferred embodiment, the voltage level tester continuously measures the voltage across the battery, and the timer identifies activation of the starter mechanism by a corresponding sudden drop in voltage across the battery.

According to the method for operating device 10 disclosed by Yaffe et al., the warning signal, in the form of an audible alarm or visual signal, provided when the incremental count exceeds a given number, is generated following activation of the starter mechanism or motor. The main objective of this procedure, that of alerting a vehicle operator, following engine starting, of deterioration of a starter mechanism in general, and of near failing battery charge in particular, may not be achieved for one or a combination of the following realistically limiting reasons.

First, following engine starting, activation of a standard audible alarm used in such an application may be insufficiently loud to overcome normal background noise internal and/or external to the vehicle, continuing henceforth from engine starting, in order to be effectively heard by the vehicle operator. With respect to noise internal to the vehicle, this is especially the case if vehicle accessories such as a radio and/or a climate control mechanism are simultaneously activated with engine starting, a situation quite commonly occurring as a consequence of a vehicle operator failing to turn-off all accessories prior to the time of previous engine turn-off. Moreover, depending upon the immediate environment of the initially parked vehicle, such an audible alarm simply may not be able to compete with substantially higher decibel levels of noise external to the vehicle, especially in urban environments.

Second, following engine starting, activation of a deteriorating starter mechanism visual warning signal appearing, for example, somewhere along the operator side of the vehicle dashboard, may not be noticed among the standard multitude of visual signals also displayed along the operator side of the vehicle dashboard. Third, following engine starting, the audible alarm and/or visual signal may malfunction or even be entirely absent due to circuit failure. Thus, the device and method for warning a vehicle operator of starter mechanism, or battery, deterioration as disclosed by Yaffe et al. are expected to be effective under essentially ideal engine starting conditions, but, are notably limited under realistic vehicle starting and operating conditions.

To one of ordinary skill of the art, there is thus a need for, and it would be highly advantageous to have an improved device and corresponding improved method for warning a vehicle operator of deterioration of a starter mechanism in which a motor is powered by a battery to start a combustion engine, prior to failure of the starter mechanism to enable starting of the engine.

SUMMARY OF THE INVENTION

The present invention relates to an improved device and corresponding improved method for warning of deterioration of a starter mechanism in which a motor is powered by a battery to start a combustion engine, prior to failure of the starter mechanism to enable starting of the engine.

It is therefore an object of the present invention to provide an improved device for warning of vehicle battery deterioration.

It is another object of the present invention to provide an improved method for warning of vehicle battery deterioration.

It is a further object of the present invention to provide an improved device and method for warning of vehicle battery deterioration which overcome limitations associated with providing a vehicle operator with a warning signal of starter mechanism deterioration during realistically unfavorable conditions of starting and operating a vehicle, by including components and mechanisms for providing an additional warning signal of the starter mechanism deterioration following engine turn-off.

It is yet a further object of the present invention to provide an improved device and method for warning of vehicle battery deterioration featuring, as improvement, at least one noise and/or vibration sensor, at least one corresponding noise and/or vibration level tester, a logic circuit, and a delay mechanism, thereby enabling provision of an additional warning signal of the starter mechanism deterioration following engine turn-off.

It is yet a further object of the present invention to provide an improved device and method for warning of vehicle battery deterioration featuring, as improvement, at least one noise and/or vibration sensor, at least one corresponding noise and/or vibration level tester, a logic circuit, a delay mechanism, and a latch circuit, thereby enabling provision of an additional warning signal of the starter mechanism deterioration following engine turn-off.

Thus, according to the present invention, there is provided an improved device for warning of deterioration of a starter mechanism in which a motor is powered by a battery to start a combustion engine, featuring (a) a voltage level tester connected so as to measure a voltage across the battery, (b) a timer operatively connected to the voltage level tester so as to be actuated in response to a sudden drop in the voltage to time a given time interval, (c) a counter operatively connected to the timer so as to be actuated exclusively at the end of the given time interval, the counter further being associated with the voltage level tester so as to maintain an incremental count of occasions on which the voltage is less than a given level at the end of the given time interval, and (d) an alarm unit for providing a warning signal when the incremental count exceeds a given number, the improvement comprising: (e) at least one engine characteristic sensor selected from the group consisting of engine noise sensors and engine vibration sensors operatively connected for sensing at least one engine characteristic selected from the group consisting of engine noise and engine vibration; (f) at least one engine characteristic level tester selected from the group consisting of engine noise level testers and engine vibration level testers operatively connected so as to measure the at least one engine characteristic sensed by the at least one engine characteristic sensor and to compare the measurement to at least one corresponding pre-determined threshold level of the at least one engine characteristic for distinguishing between engine activation and engine non-activation, the engine non-activation including engine turn-off; (g) a logic circuit operatively connected to the at least one engine characteristic level tester and to the alarm unit for performing at least one 'AND' logic operation on a first signal received from the at least one engine characteristic level tester and on a delayed second signal received from the counter, the logic circuit upon completing a particular the 'AND' logic operation actuates the alarm unit for providing an additional warning signal following the engine turn-off; and (h) a delay mechanism operatively connected to the counter and to the logic circuit for effecting the delay of the delayed second signal sent from the counter to the logic circuit so as to effect actuation of the alarm unit for providing the additional warning signal following the engine turn-off.

According to further features in this preferred embodiment of the invention described below, the at least one engine characteristic level tester measures the at least one engine characteristic as a function of time selected from the group consisting of a continuous function of time and a discontinuous function of time.

According to further features in this preferred embodiment of the invention described below, the device further comprises at least one temperature sensor associated with corresponding at least one engine characteristic level tester for measuring ambient temperature in a vicinity of the engine, and wherein the engine characteristic level varies in relation to the ambient temperature.

According to further features in this preferred embodiment of the invention described below, the particular 'AND' logic operation performed by the logic circuit for the actuating the alarm unit for providing the additional warning signal following the engine turn-off is fulfilled by the logic circuit receiving the first signal from the at least one engine characteristic level tester registering the engine characteristic less than the pre-determined threshold level corresponding to the engine turn-off, and receiving the delayed second signal from the counter registering the incremental count of occasions exceeding the given number on which the voltage is less than the given level at the end of the given time interval.

According to further features in this preferred embodiment of the invention described below, the additional warning signal is at least one signal selected from the group consisting of an audio signal, a visual signal, and an electromagnetic signal.

According to another aspect of the present invention, there is provided an improved device for warning of deterioration of a starter mechanism in which a motor is powered by a battery to start a combustion engine, featuring (a) a voltage level tester connected so as to measure a voltage across the battery, (b) a timer operatively connected to the voltage level tester so as to be actuated in response to the voltage being less than a given level to time a given time interval, and (c) an alarm unit operatively connected to the timer so as to be actuated after the end of the given time interval for providing a warning signal, the improvement comprising: (d) at least one engine characteristic sensor selected from the group consisting of engine noise sensors and engine vibration sensors operatively connected for sensing at least one engine characteristic selected from the group consisting of engine noise and engine vibration; (e) at least one engine characteristic level tester selected from the group consisting of noise sensor level testers and vibration sensor level testers operatively connected so as to measure the at least one engine characteristic sensed by the at least one sensor and to compare the measurement to at least one corresponding pre-determined threshold level of the at least one engine characteristic for distinguishing between engine activation and engine non-activation, the engine non-activation including engine turn-off; (f) a logic circuit operatively connected to the at least one engine characteristic level tester and to the alarm unit for performing at least one 'AND' logic operation on a first signal received from the at least one engine characteristic level tester and on a delayed second signal received from the timer, the logic circuit upon completing a particular 'AND' logic operation actuates the alarm unit for providing an additional warning signal following the engine turn-off; (g) a latch circuit operatively connected to the logic circuit for storing the delayed second signal sent from the timer and for sending the delayed second signal to the logic circuit; and (h) a delay mechanism operatively connected to the timer and to the latch circuit for effecting the delay of the delayed second signal sent from the timer to the latch circuit so as to effect the logic circuit actuating the alarm unit for providing the additional warning signal following the engine turn-off.

According to further features in this preferred embodiment of the invention described below, the at least one engine characteristic level tester measures the at least one engine characteristic as a function of time selected from the group consisting of a continuous function of time and a discontinuous function of time.

According to further features in this preferred embodiment of the invention described below, the device further comprises at least one temperature sensor associated with corresponding at least one engine characteristic level tester for measuring ambient temperature in a vicinity of the engine, and wherein the engine characteristic level varies in relation to the ambient temperature.

According to further features in this preferred embodiment of the invention described below, the particular 'AND' logic operation performed by the logic circuit for the actuating the alarm unit for providing the additional warning signal following the engine turn-off is fulfilled by the logic circuit receiving the first signal from the at least one engine characteristic level tester registering the engine characteristic less than the pre-determined threshold level corresponding to the engine turn-off, and receiving the delayed second signal from the latch circuit registering the voltage less than the given level at the end of the given time interval.

According to further features in this preferred embodiment of the invention described below, the additional warning signal is at least one signal selected from the group consisting of an audio signal, a visual signal, and an electromagnetic signal.

According to another aspect of the present invention, there is provided an improved method for warning of deterioration of a starter mechanism in which a motor is powered by a battery to start a combustion engine, featuring the steps of (a) sensing activation of the starter mechanism, (b) when a given time interval has elapsed since the activation, measuring a voltage across the battery, (c) maintaining an incremental count of the number of occasions on which the voltage is less than a given level at the end of the time interval, and (d) providing a warning signal when the incremental count exceeds a given number, the improvement comprising the steps of: (e) sensing at least one engine characteristic selected from the group consisting of engine noise and engine vibration; (f) measuring the at least one engine characteristic of the engine and comparing the at least one engine characteristic to at least one corresponding pre-determined threshold level of the engine characteristic for distinguishing between engine activation and engine non-activation, the engine non-activation including engine turn-off; (g) performing at least one 'AND' logic operation on a first signal corresponding to the at least one engine characteristic and on a delayed second signal corresponding to the incremental count; and (h) upon completing a particular 'AND' logic operation, actuating the alarm unit for providing an additional warning signal following the engine turn-off.

According to further features in this preferred embodiment of the invention described below, the step of measuring the at least one engine characteristic is performed as a function of time selected from the group consisting of a continuous function of time and a discontinuous function of time.

According to further features in this preferred embodiment of the invention described below, the method further comprises the step of measuring ambient temperature in a vicinity of the engine, whereby the engine characteristic level varies in relation to the ambient temperature.

According to further features in this preferred embodiment of the invention described below, the particular 'AND' logic operation performed by the logic circuit for the actuating the alarm unit for providing the additional warning signal following the engine turn-off is fulfilled by the logic circuit receiving the first signal from the at least one engine characteristic level tester registering the engine characteristic less than the pre-determined threshold level corresponding to the engine turn-off, and receiving the delayed second signal from the counter registering the incremental count of occasions exceeding the given number on which the voltage is less than the given level at the end of the given time interval.

According to further features in this preferred embodiment of the invention described below, the additional warning signal is at least one signal selected from the group consisting of an audio signal, a visual signal, and an electromagnetic signal.

According to another aspect of the present invention, there is provided an improved method for warning of deterioration of a starter mechanism in which a motor is powered by a battery to start a combustion engine, featuring the steps of (a) sensing activation of the starter mechanism, (b) when a given time interval has elapsed since the activation, measuring a voltage across the battery, and (c) providing a warning signal when the voltage is below a given level, the improvement comprising the steps of: (d) sensing at least one engine characteristic selected from the group consisting of engine noise and engine vibration; (e) measuring the at least one engine characteristic of the engine and comparing the at least one engine characteristic to at least one corresponding pre-determined threshold level of the engine characteristic for distinguishing between engine activation and engine non-activation, the engine non-activation including engine turn-off; (f) performing at least one 'AND' logic operation on a first signal corresponding to the at least one engine characteristic and on a delayed second signal sent from the timer at the end of the given time interval corresponding to the voltage being below the given level; and (g) upon completing a particular 'AND' logic operation, actuating the alarm unit for providing an additional warning signal following the engine turn-off.

According to further features in this preferred embodiment of the invention described below, the step of measuring the at least one engine characteristic is performed as a function of time selected from the group consisting of a continuous function of time and a discontinuous function of time.

According to further features in this preferred embodiment of the invention described below, the method further comprises the step of measuring ambient temperature in a vicinity of the engine, whereby the engine characteristic level varies in relation to the ambient temperature.

According to further features in this preferred embodiment of the invention described below, the particular 'AND' logic operation performed by the logic circuit for the actuating the alarm unit for providing the additional warning signal following the engine turn-off is fulfilled by the logic circuit receiving the first signal from the at least one engine characteristic level tester registering the engine characteristic less than the pre-determined threshold level corresponding to the engine turn-off, and receiving the delayed second signal from the latch circuit registering the voltage less than the given level at the end of the given time interval.

According to further features in this preferred embodiment of the invention described below, the additional warning signal is at least one signal selected from the group consisting of an audio signal, a visual signal, and an electromagnetic signal.

The improved device and corresponding method for warning of deterioration of a starter mechanism in which a motor is powered by a battery to start a combustion engine, prior to failure of the starter mechanism to enable starting of the engine, of the present invention, successfully address limitations of presently available devices and methods by significantly increasing the effectiveness, in a safe manner, of providing a warning signal of the indicated deterioration to the vehicle operator. Limitations associated with providing a vehicle operator with a warning signal of starter mechanism deterioration during realistically unfavorable conditions of starting and operating a vehicle are overcome by providing an additional warning signal of the starter mechanism deterioration following engine turn-off.

Implementation and operation of the device and method of the present invention involve performing or completing selected tasks or steps manually, automatically, or a combination thereof. Moreover, according to actual instrumentation and equipment of the preferred embodiments of the device, several selected steps of the method could be implemented by appropriate hardware or software or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method of the invention could be described as being performed by a data processor, such as a computing platform for executing a plurality of instructions.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to an improved device and corresponding improved method for warning of deterioration of a starter mechanism in which a motor is powered by a battery to start a combustion engine, prior to failure of the starter mechanism to enable starting of the engine.

The improved device and method of the present invention are based on the novel addition of at least one noise and/or vibration sensor, at least one corresponding noise and/or vibration level tester, a logic circuit, and a delay mechanism, to the device and method disclosed by Yaffe et al., in U.S. Pat. No. 5,818,333, which is incorporated by reference for all purposes as if fully set forth herein. Addition of these components enable the device and method to provide a warning signal of starter mechanism deterioration following engine turn-off, whereby activation of the warning signal overcomes limitations related to providing a warning signal following engine start-up.

It is to be understood that the invention is not limited in its application to the details of construction, arrangement, and composition of the components set forth in the following description or drawings. The invention is capable of other embodiments or of being practiced or carried out in various ways. For example, any number of the electronic components or elements featured or included in the following described embodiments may be either digital or analog, operatively connected and functioning in a corresponding digital, logical, or analog mode. Moreover, any connection among any number of the electronic components or elements of the device may be formed by using direct or mechanical means, or, by using indirect or electrical means such as in a circuit of the overall vehicle electrical system, where a mechanical or electrical connection may be internal or external to the engine compartment. Also, it is to be understood that the phraseology and terminology employed herein are for the purpose of description and should not be regarded as limiting.

Components, operation, and implementation of an improved device and method for warning of deterioration of a starter mechanism of a combustion engine, such as battery deterioration, prior to failure of the starter mechanism to enable starting of the vehicle engine, according to the present invention are better understood with reference to the drawings and the accompanying description.

Figure 1:
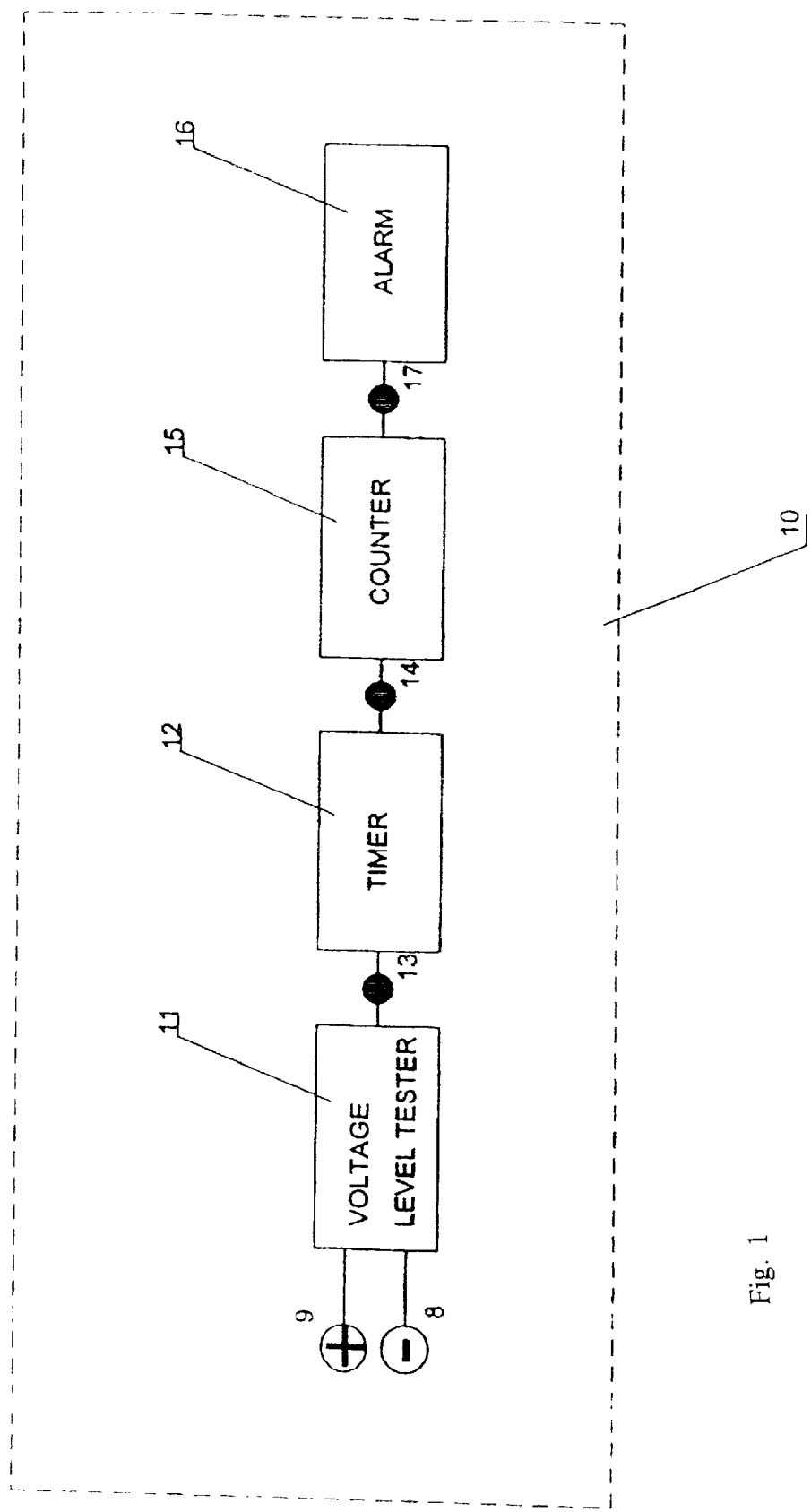
FIG. 1 is a block diagram of the prior art device, constructed and operative according to the teachings of U.S. Pat. No. 5,818,333.
Figure 2:
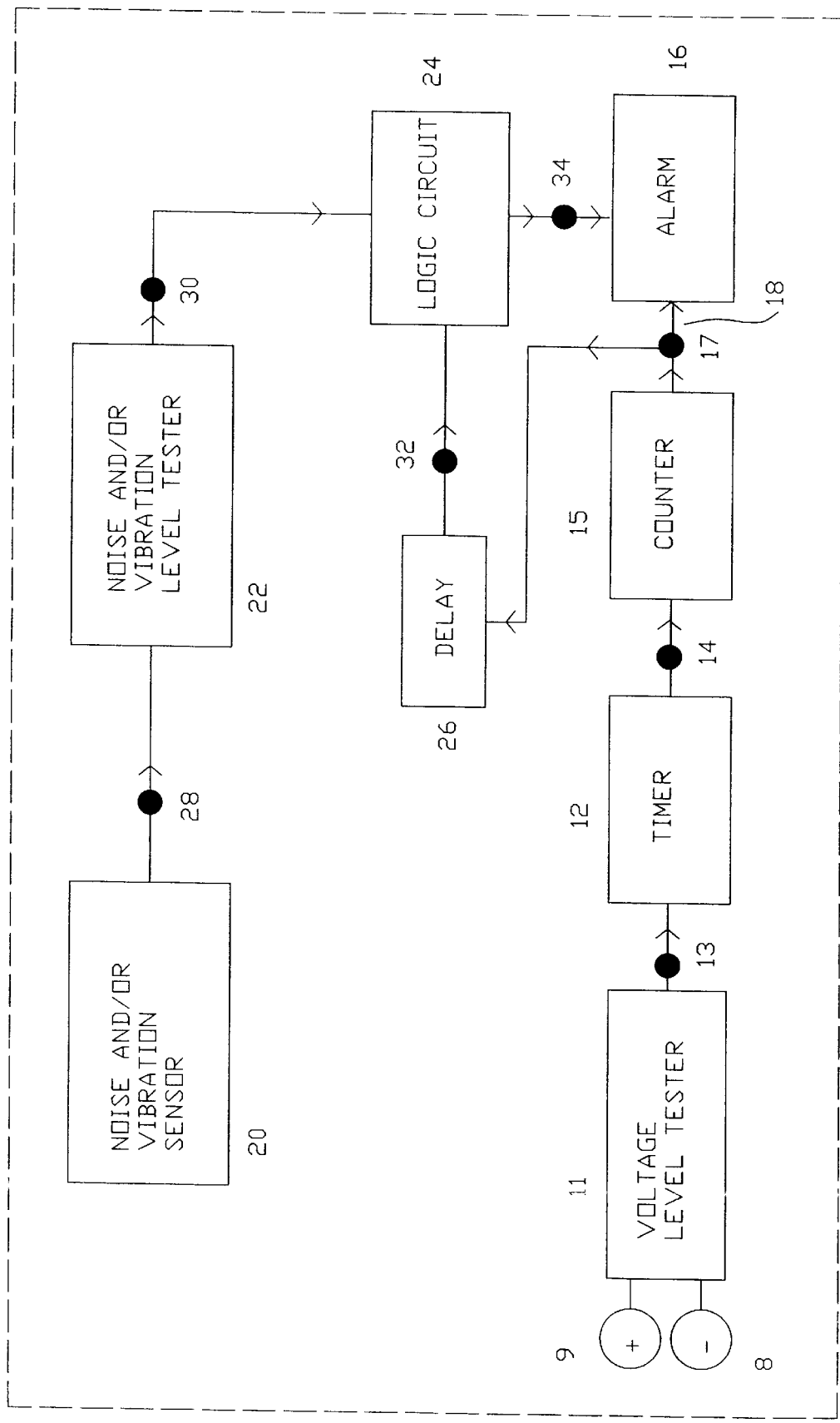
FIG. 2 is a block diagram illustrating a preferred embodiment of an improved device for warning of deterioration of a starter mechanism of a combustion engine, in accordance with the present invention.

Referring now to the drawings, FIG. 2 is a block diagram illustrating a preferred embodiment of an improved device, generally designated 40, constructed and operative for warning of deterioration of a starter mechanism of a combustion engine, in accordance with the following accompanying method of the present invention. Device 40 is, preferably, permanently connected to negative and positive battery leads, 8 and 9, respectively, and operates on the principle that the battery needs to supply a large current to the starter mechanism of the motor. Device 40 automatically checks the power of a battery (not shown), including from the time a starter mechanism (not shown) is activated or energized, such as by turning a key, for initiating cranking of the motor crankshaft.

Device 40 features (a) a voltage level tester 11, (b) a timer 12, (c) a counter 15, (d) an alarm unit 16, and additionally features (e) a noise and/or vibration sensor 20, (f) a noise and/or vibration level tester 22, (g) a logic circuit 24, and (h) a delay mechanism 26. In addition, device 40 includes battery negative and positive leads 8 and 9, respectively, and corresponding device/circuit junctions 13, 14, 17, 28, 30, 32, and 34.

Voltage level tester 11 is connected to battery leads 8 and 9, forming a direct or mechanical connection, or, an indirect or electrical connection such as in a circuit of the overall vehicle electrical system, where the electrical connection may be internal or external to the engine compartment. Voltage level tester 11 functions by measuring a voltage across the battery at any instant of time, including before engine starting, during engine starting, and after engine starting.

The starter mechanism of the engine operates in relation to an electrically and mechanically varying load, where the load features a varying combination of electrical and mechanical loads, including the vehicle battery, starter motor, motor crankshaft, coil, and any other vehicle component or accessory which may electrically and/or mechanically influence or be connected to the same load. Prior to activation and turning of the starter motor, the electromechanical load of the circuit is relatively low. Following activation and turning of the starter motor via current supplied by the battery, the electromechanical load increases accordingly, along with a corresponding change in battery voltage, measured by voltage level tester 11.

At the instant of starting the vehicle motor, voltage level tester 11 senses activation of the starter mechanism. Voltage level tester 11 then measures the voltage across battery poles 8 and 9, and compares this voltage to a pre-determined level. This measurement is done while the starter motor, connected to the battery, turns. During this time interval of connection of the starter motor to the battery, there is concurrently a sharp drop in voltage across battery poles 8 and 9. Voltage level tester 11 identifies this sharp drop in battery voltage, and sends a signal via circuit junction 13 for activating timer 12.

Timer 12 functions to prompt another measurement of battery voltage by voltage level tester 11 after a pre-determined time interval, and compares this voltage to a pre-determined battery voltage level. This measurement is made following a pre-determined time interval, while the starter motor is still turning. If the battery voltage, following this time interval of starter motor turning, is less than a pre-determined voltage level, this is considered a countable occurrence, and timer 12 sends a signal via circuit junction 14 for activating counter 15.

Counter 15 maintains a cumulative or incremental count of each above described occurrence of drop in voltage level. When counter 15 registers a number of counts of occurrences, of a drop in battery voltage less than a pre-determined voltage level for a pre-determined time interval, greater than a pre-determined number of counts, counter 15 sends a signal via circuit junction 17 for activating alarm unit 16.

Alarm unit 16 provides a warning signal of starter mechanism deterioration to the vehicle operator, where the warning signal may be any combination of an audible signal sounding inside the vehicle cabin, a visual signal appearing on the dashboard display inside the vehicle cabin, or an electromagnetic signal either internal or external to the vehicle cabin. Thus, assuming the vehicle operator notices the warning signal following engine starting, he can plan to replace the battery prior to the battery failing to enable starting of the engine.

Under realistic vehicle starting and operating conditions characterized by various background noises, operator distractions, and possible device malfunction, internal and/or external to the vehicle cabin, the vehicle operator is quite likely not to notice or receive the warning signal of starter mechanism deterioration following engine starting. For example, background noise internal and/or external to the vehicle cabin at the time of engine starting may drown out the warning sound of a standard alarm unit 16. Moreover, the usual multitude of vehicle system indicators displayed along the dashboard during engine starting may disguise the display of a visual warning signal of starter mechanism deterioration. Another likely limiting event is that of device malfunction, whereby alarm unit 16 may not receive the signal from counter 15 via circuit junction 17.

To overcome these realistically limiting circumstances of warning the vehicle operator of starter mechanism deterioration at the time of engine starting, improved device 40 of the present invention includes additional components for enabling device 40 to send a properly synchronized low battery voltage signal to alarm unit 16, for providing a warning signal to the vehicle operator following engine turn-off.

Referring again to device 40 of FIG. 2, at least one engine characteristic sensor, where an engine characteristic sensor includes engine noise and/or engine vibration sensor 20, and at least one corresponding engine characteristic level tester, including noise and/or vibration level tester 22, are included in the overall circuit of device 40, and as such are continuously in an active mode, similar to the continuous active mode of voltage level tester 11. As herein described below, noise and/or vibration sensor 20, and noise and/or vibration level tester 22, function in the circuit of device 40, by detecting engine noise and/or engine vibration, including the condition of sufficiently low engine noise and/or engine vibration when the vehicle engine is turned off, and by sending a corresponding signal to a logic circuit 24 which is properly synchronized by a delay mechanism 26 for receiving a delayed low battery voltage cumulative count signal from counter 15. Logic circuit 24 prompts activation of alarm unit 16, which subsequently provides a warning signal of starter mechanism deterioration to the vehicle operator following engine turn-off.

Noise and/or vibration sensor 20 continuously senses noise and/or vibration of the engine. For the engine in a non-activated mode, such as when the starter mechanism or engine is not running, noise and/or vibration sensor 20 senses noise and/or vibration less than a predetermined threshold level. For the engine in an activated mode, such as during activation of the starter mechanism or during subsequent running of the engine, noise and/or vibration sensor 20 senses noise and/or vibration greater than a predetermined threshold level. According to the state of the engine, running or not, noise and/or vibration sensor 20 continuously sends a corresponding signal via circuit junction 28 to noise and/or vibration level tester 22.

Noise and/or vibration level tester 22 functions to determine the level of noise and/or vibration of the engine, continuously or discontinuously with time, relative to, such as less than, equal to, or greater than, a corresponding pre-determined threshold noise and/or vibration level. Noise and/or vibration level of the engine is continuously, or discontinuously, sent as a signal via circuit junction 30 to logic circuit 24.

Logic circuit 24 is properly synchronized by delay mechanism 26 for receiving a delayed low battery voltage incremental or cumulative count signal from counter 15 via circuit junctions 17 and 32. Logic circuit 24 sends a signal via circuit junction 34 for activating alarm unit 16, which subsequently provides a warning signal of starter mechanism deterioration to the vehicle operator following engine turn-off. Thus, regardless whether the vehicle operator noticed or received the warning signal of starter mechanism deterioration following engine starting, and assuming the vehicle operator notices or receives the warning signal following engine turn-off, he can plan to replace the battery prior to the battery failing to enable starting of the engine.

The reason for including delay mechanism 26 in the circuit of device 40 prior to logic circuit 24 is as follows. A main objective of the improved device and method of the present invention is to enable device 40 to provide a warning signal of starter mechanism deterioration to the vehicle operator following engine turn-off, either in addition to, or instead of device 40 providing a warning signal following engine starting. Logic circuit 24 operates according to the 'AND' logic operator, receiving (i) a first signal from noise and/or vibration level tester 22 via circuit junction 30, and (ii) a second signal from counter 15 via circuit junction 17. The required, or particular, condition of the 'AND' logic function causing logic circuit 24 to prompt alarm unit 16 to provide a warning signal of starter mechanism deterioration following engine turn-off is fulfilled by logic circuit 24 receiving (i) a first signal from noise and/or vibration level tester 22 registering noise and/or vibration less than a pre-determined threshold level of noise and/or vibration 'AND' receiving (ii) a delayed second signal from counter 17 registering a low battery voltage incremental or cumulative count greater than a pre-determined number of counts.

Initially, prior to engine starting, noise and/or vibration sensor 20 senses noise and/or vibration less than a pre-determined threshold level and provides this signal to noise and/or vibration level tester 22. Consequently, logic circuit 24 receives a less than threshold level first signal from noise and/or vibration level tester 22. This signal is indicative of vehicle non-activated mode which includes a noise and/or vibration level tester signal following engine turn-off. Thus, one half of the required or particular 'AND' condition, for causing actuation of alarm unit 16, is registered by logic circuit 24 at this time.

During and following the time of engine starting, for the situation when counter 15 registers a low battery voltage cumulative count greater than the pre-determined number of counts, according to the circuit of device 40, counter 15 simultaneously sends a signal via circuit junction 17 to alarm unit 16 and to delay mechanism 26. In the absence of delay mechanism 26, logic circuit 24 would receive a greater than condition cumulative count second signal from counter 15, which, combined with the initial first signal of less than threshold condition of vehicle noise and/or vibration from noise and/or vibration level tester 22, would cause an undesirable registration of, during and/or following engine starting, the required or particular 'AND' logic condition for prompting logic circuit 24 to send a signal to alarm unit 16 for providing a warning signal of to a steady state operating mode, in order for the engine to be turned off. Following engine turn-off, noise and/or vibration sensor 20 and noise and/or vibration level tester 22 properly functions to provide logic circuit 24 a proper signal of engine turn-off, at which time, a desirable registration of the required or particular 'AND' logic condition is fulfilled, for prompting logic circuit 24 to send a signal to alarm unit 16 for providing a warning signal of starter mechanism deterioration following engine turn-off.

In an alternative embodiment of the above described device and method of the present invention, device 40 is designed for enabling alarm unit 16 to provide a warning signal of starter mechanism deterioration to the vehicle operator following engine turn-off only, without providing a warning signal following engine starting. This alternative operation of device 40 may be more practically suitable to certain vehicle operators, for instance, desiring to receive a warning signal only following engine turn-off. In accordance with this alternative embodiment, in FIG. 2, circuit junction 17 is not connected to alarm unit 16, as indicated by dashed line 18. As such, device 40 operates as described above, but with low battery voltage counter 15 sending a second signal only to delay device 26 via circuit junction 17, followed by the previously described method for causing alarm unit 16 to provide a warning signal of starter mechanism deterioration following engine turn-off, in the form of an audio, visual, and/or electromagnetic, signal to the vehicle operator.

Figure 3:
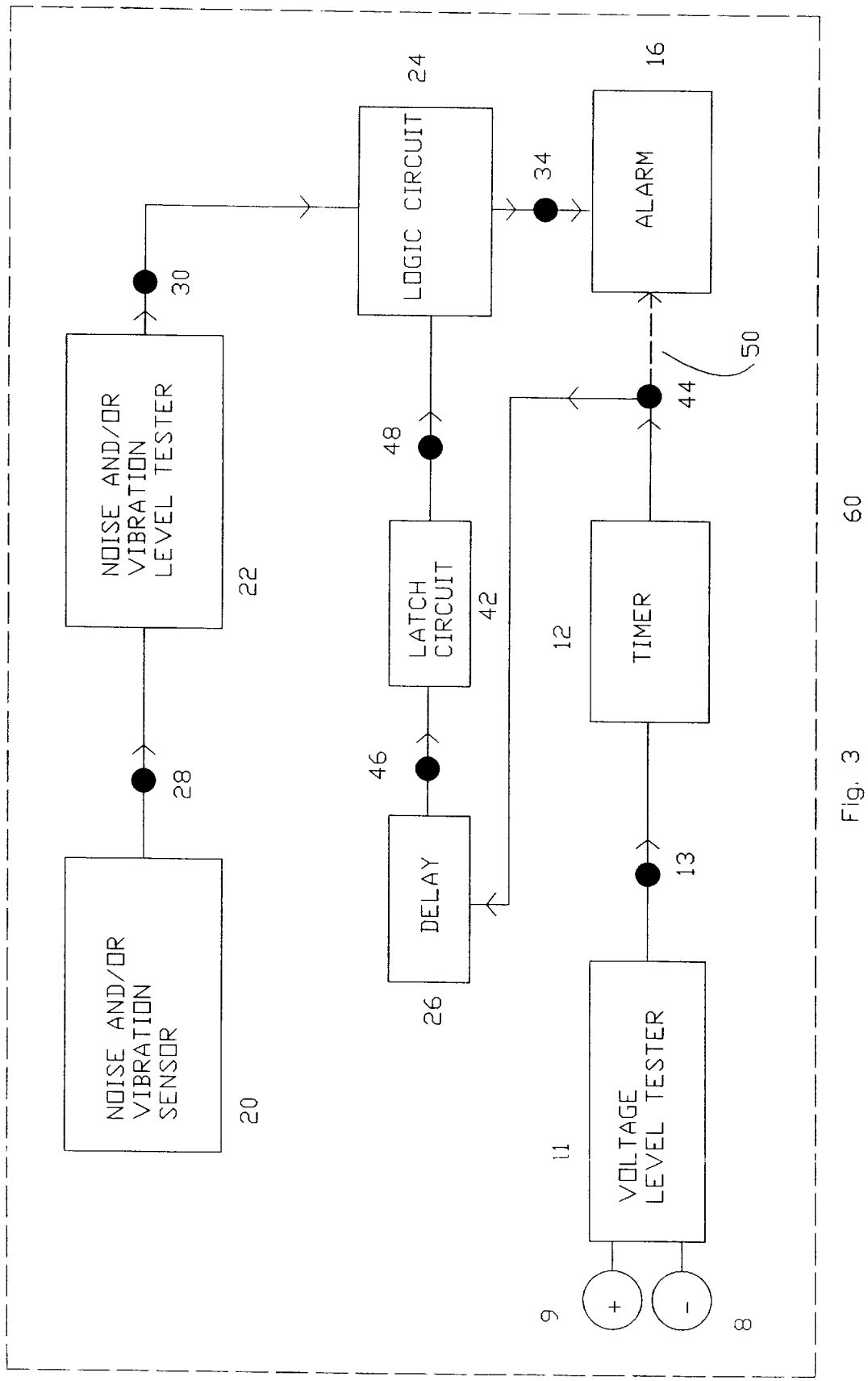
FIG. 3 is a block diagram illustrating another preferred embodiment of an improved device for warning of deterioration of a starter mechanism of a combustion engine, in accordance with the present invention.

A relatively simpler circuit design, without counter 15, of device 40, of the present invention is provided in FIG. 3, a block diagram illustrating another preferred embodiment of an improved device for warning of deterioration of a starter mechanism of a combustion engine. In FIG. 3, device 60 is constructed and operative for warning of deterioration of a starter mechanism of a combustion engine, in accordance with the following accompanying method. Similar to device 40 of FIG. 2, device 60 is, preferably, permanently connected, directly or indirectly, to negative and positive battery leads, 8 and 9, respectively, operates on the principle that the battery needs to supply a large current to the starter mechanism of the motor, and automatically checks the power of a battery (not shown), including from the time a starter mechanism (not shown) is activated or energized, such as by turning a key, for initiating cranking of the motor crankshaft.

Device 60 features (a) a voltage level tester 11, (b) a timer 12, (c) an alarm unit 16, and additionally features (d) a noise and/or vibration sensor 20, (e) a noise and/or vibration level tester 22, (f) a logic circuit 24, (g) a delay mechanism 26, and (h) a latch circuit. In addition, device 60 includes battery negative and positive leads 8 and 9, respectively, and corresponding device/circuit junctions 13, 44, 28, 30, 46, 48, and 34.

Description and method of operation of device 60 are essentially the same as for device 40 of FIG. 2, with the following differences. For simplicity, there is no counter mechanism such as counter 15 of device 40, wherein device 60, at time of engine starting, timer 12, following completion of a pre-determined time interval of timing an occurrence of battery voltage less than a pre-determined voltage level registered by voltage level tester 11, sends a low battery voltage signal via circuit junction 44 directly to alarm unit 16, followed by providing a warning signal of starter mechanism deterioration to the vehicle operator following engine starting. During engine starting, simultaneous to timer 12 sending a low battery voltage signal to alarm unit 16, timer 12 sends a same signal to delay mechanism 26, ultimately targeted for delayed reception by logic circuit 24, in order to prompt alarm unit 16 to provide a warning signal of starter mechanism deterioration to the vehicle operator following engine turn-off, as described above for device 40.

According to the design of device 60, delay mechanism 26 registers a signal of low battery voltage directly from timer 12, and, as such, depends upon the instantaneous status of timer 12. However, timer 12, following engine starting, and following completion of timing an occurrence of low battery voltage and simultaneously sending a signal via circuit junction 44 to alarm unit 16 and to delay mechanism 26, subsequently receives a new signal from voltage level tester 11 corresponding to a battery voltage higher than a pre-determined level, as the engine is no longer in a starting mode, whereby a generator or alternator now charges the discharged battery. Accordingly, timer 12 is automatically reset for timing of a next occurrence of low battery voltage measured by voltage level tester 11 during the next occurrence of engine starting.

Following engine starting and continuing throughout engine operation, as long as timer 12 receives a signal of battery voltage higher than a pre-determined level from voltage level tester 12, timer 12 provides no signal via circuit junction 44 to either alarm unit 16 or to delay mechanism 26. Alarm unit 16 already performed its function of providing a warning signal of starter mechanism deterioration to the vehicle operator following engine starting, however, logic circuit 24 has not yet performed its function of providing a warning signal following engine turn-off. As such, a mechanism for remembering or storing the signal of low battery voltage previously received by delay mechanism 26, during engine starting, needs to be included in the circuit of device 60.

A latch circuit 42, also commonly known as a flip-flop circuit, is therefore included in the circuit of device 60, functioning by storing the delayed signal of low battery voltage previously sent by timer 12 during engine starting, and by providing this signal via circuit junction 48 to logic circuit 24. In operation of device 60, the required, or particular, condition of the 'AND' logic function causing logic circuit 24 to prompt alarm unit 16 to provide a warning signal of starter mechanism deterioration following engine turn-off is fulfilled by logic circuit 24 receiving (i) a first signal from noise and/or vibration level tester 22 registering noise and/or vibration level less than a pre-determined threshold level of noise and/or vibration 'AND' receiving (ii) a delayed second signal from latch circuit 42 registering a battery voltage less than a pre-determined level.

Subsequently, similar to the above description of device 40, following engine turn-off, logic circuit 24 sends a signal via circuit junction 34 to alarm unit 16 for providing a warning signal of starter mechanism deterioration to the vehicle operator following engine turn-off. Thus, regardless whether the vehicle operator noticed or received the warning signal of starter mechanism deterioration following engine starting, and assuming the vehicle operator notices or receives the warning signal following engine turn-off, he can plan to replace the battery prior to the battery failing to enable starting of the engine.

In an alternative embodiment of the above described device and method of the present invention, device 60 is designed for enabling alarm unit 16 to provide a warning signal of starter mechanism deterioration to the vehicle operator following engine turn-off only, without providing a warning signal following engine starting. This alternative operation of device 60 may be more practically suitable to certain vehicle operators, for instance, desiring receiving a warning signal only following engine turn-off. In accordance with this alternative embodiment, in FIG. 3, circuit junction 44 is not connected to alarm unit 16, as indicated by dashed line 50. As such, device 60 operates as described above, but with timer 12 sending a signal of low battery voltage only to delay device 26 via circuit junction 44, followed by the previously described method for actuating alarm unit 16 to provide a warning signal of starter mechanism deterioration following engine turn-off, in the form of an audio, visual, and/or electromagnetic, signal to the vehicle operator.

An optional feature of each of the above described preferred embodiments of the device and method of the present invention is for inclusion of at least one temperature sensor (not shown). Including this feature, voltage level tester 11 is responsive to a temperature sensor by automatically setting the pre-determined voltage level according to a selected reference temperature, such as ambient temperature. Alternatively or additionally, timer 12 is responsive to a temperature sensor by automatically setting the pre-determined time interval according to a selected reference temperature, such as ambient temperature. Alternatively or additionally, at least one noise and/or vibration level tester 22 is responsive to a corresponding at least one temperature sensor by automatically setting the pre-determined noise and/or vibration threshold levels according to a selected reference temperature, such as ambient temperature.

As will already be understood, an object of the invention is to provide a warning device which signals or warns when the electrical power of the battery reaches a pre-determined level, following engine starting and following engine turn-off, or just following engine turn-off. The battery will not be able to activate or energize the starter motor, and therefore, the motor for long, below this level. Moreover, the device and method automatically determine a weak battery condition at the time the battery is about to be electrically emptied, when other starter mechanism elements are in normal working order.

An advantage of the device and method of the present invention for testing a vehicle battery is that they are based on a direct test of the ability of a specific vehicle battery to start the vehicle. Measuring and testing of battery voltage are done each time the starter mechanism is operated, without intervention of additional personnel such as a trained mechanic, and do not result in providing an average value of internal resistance as is determined by other battery voltage measuring and testing systems.

Because the device and method check the starting voltage at the time of engine starting, identification of a drop in battery voltage indicates a fault in at least one of the starter mechanism elements part of the operation of starting the engine, and not just checking the electrical power of the battery as done in other battery voltage measuring and testing systems. By way of example, when in the event of electrical and/or mechanical damage to the motor, difficulty is often encountered in activating or energizing the starter mechanism, in part due to the occurrence of an abnormally high electrical and/or mechanical load, despite the fact that the battery functions according to specification. Starting the engine is accompanied by a large drop of battery voltage. Therefore, the device and method of the present invention are particularly effective in identifying problems associated in activating the starting mechanism, even when the battery is properly functioning. This allows identification and repair of electrical and/or mechanical faults and increases the life span of the battery.

The above described preferred embodiments of the device and method of the present invention successfully address limitations of presently available devices and methods by significantly increasing the effectiveness, in a safe manner, of providing a warning signal of starter mechanism deterioration to the vehicle operator. Limitations associated with providing a vehicle operator with a warning signal of starter mechanism deterioration during realistically unfavorable conditions of starting and operating a vehicle are overcome by providing an additional warning signal of the starter mechanism deterioration following engine turn-off.

While the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An improved device for warning of deterioration of a starter mechanism in which a motor is powered by a battery to start a combustion engine, featuring (a) a voltage level tester connected so as to measure a voltage across the battery, (b) a timer operatively connected to the voltage level tester so as to be actuated in response to a sudden drop in the voltage to time a given time interval, (c) a counter operatively connected to the timer so as to be actuated exclusively at the end of the given time interval, the counter further being associated with the voltage level tester so as to maintain an incremental count of occasions on which the voltage is less than a given level at the end of the given time interval, and (d) an alarm unit for providing a warning signal when the incremental count exceeds a given number, the improvement comprising:

(e) at least one engine characteristic sensor selected from the group consisting of engine noise sensors and engine vibration sensors operatively connected for sensing at least one engine characteristic selected from the group consisting of engine noise and engine vibration;
   (f) at least one engine characteristic level tester selected from the group consisting of engine noise level testers and engine vibration level testers operatively connected so as to measure said at least one engine characteristic sensed by said at least one engine characteristic sensor and to compare said measurement to at least one corresponding pre-determined threshold level of said at least one engine characteristic for distinguishing between engine activation and engine non-activation, said engine non-activation including engine turn-off;
   (g) a logic circuit operatively connected to said at least one engine characteristic level tester and to the alarm unit for performing at least one 'AND' logic operation on a first signal received from said at least one engine characteristic level tester and on a delayed second signal received from the counter, said logic circuit upon completing a particular said 'AND' logic operation actuates the alarm unit for providing an additional warning signal following said engine turn-off; and
   (h) a delay mechanism operatively connected to the counter and to said logic circuit for effecting said delay of said delayed second signal sent from the counter to said logic circuit so as to effect actuation of the alarm unit for providing said additional warning signal following said engine turn-off.

2. The device of claim 1, wherein said at least one engine characteristic level tester measures said at least one engine characteristic as a function of time selected from the group consisting of a continuous function of time and a discontinuous function of time.

3. The device of claim 1, further comprising at least one temperature sensor associated with corresponding said at least one engine characteristic level tester for measuring ambient temperature in a vicinity of the engine, and wherein said engine characteristic level varies in relation to said ambient temperature.

4. The device of claim 1, wherein said particular 'AND' logic operation performed by said logic circuit for said actuating the alarm unit for providing said additional warning signal following said engine turn-off is fulfilled by said logic circuit receiving said first signal from said at least one engine characteristic level tester registering said engine characteristic less than said pre-determined threshold level corresponding to said engine turn-off, and receiving said delayed second signal from the counter registering the incremental count of occasions exceeding the given number on which the voltage is less than the given level at the end of the given time interval.

5. The device of claim 1, wherein said additional warning signal is at least one said signal selected from the group consisting of an audio signal, a visual signal, and an electromagnetic signal.

6. An improved device for warning of deterioration of a starter mechanism in which a motor is powered by a battery to start a combustion engine, featuring (a) a voltage level tester connected so as to measure a voltage across the battery, (b) a timer operatively connected to the voltage level tester so as to be actuated in response to the voltage being less than a given level to time a given time interval, and (c) an alarm unit operatively connected to the timer so as to be actuated after the end of the given time interval for providing a warning signal, the improvement comprising:

(d) at least one engine characteristic sensor selected from the group consisting of engine noise sensors and engine vibration sensors operatively connected for sensing at least one engine characteristic selected from the group consisting of engine noise and engine vibration;
   (e) at least one engine characteristic level tester selected from the group consisting of noise sensor level testers and vibration sensor level testers operatively connected so as to measure said at least one engine characteristic sensed by said at least one said sensor and to compare said measurement to at least one corresponding pre-determined threshold level of said at least one engine characteristic for distinguishing between engine activation and engine non-activation, said engine non-activation including engine turn-off;
   (f) a logic circuit operatively connected to said at least one engine characteristic level tester and to the alarm unit for performing at least one 'AND' logic operation on a first signal received from said at least one engine characteristic level tester and on a delayed second signal received from the timer, said logic circuit upon completing a particular said 'AND' logic operation actuates the alarm unit for providing an additional warning signal following said engine turn-off;
   (g) a latch circuit operatively connected to said logic circuit for storing said delayed second signal sent from the timer and for sending said delayed second signal to said logic circuit; and
   (h) a delay mechanism operatively connected to the timer and to said latch circuit for effecting said delay of said delayed second signal sent from the timer to said latch circuit so as to effect said logic circuit actuating the alarm unit for providing said additional warning signal following said engine turn-off.

7. The device of claim 6, wherein said at least one engine characteristic level tester measures said at least one engine characteristic as a function of time selected from the group consisting of a continuous function of time and a discontinuous function of time.

8. The device of claim 6, further comprising at least one temperature sensor associated with corresponding said at least one engine characteristic level tester for measuring ambient temperature in a vicinity of the engine, and wherein said engine characteristic level varies in relation to said ambient temperature.

9. The device of claim 6, wherein said particular 'AND' logic operation performed by said logic circuit for said actuating the alarm unit for providing said additional warning signal following said engine turn-off is fulfilled by said logic circuit receiving said first signal from said at least one engine characteristic level tester registering said engine characteristic less than said pre-determined threshold level corresponding to said engine turn-off, and receiving said delayed second signal from said latch circuit registering the voltage less than the given level at the end of the given time interval.

10. The device of claim 6, wherein said additional warning signal is at least one said signal selected from the group consisting of an audio signal, a visual signal, and an electromagnetic signal.

11. An improved method for warning of deterioration of a starter mechanism in which a motor is powered by a battery to start a combustion engine, featuring the steps of (a) sensing activation of the starter mechanism, (b) when a given time interval has elapsed since the activation, measuring a voltage across the battery, (c) maintaining an incremental count of the number of occasions on which the voltage is less than a given level at the end of the time interval, and (d) providing a warning signal when the incremental count exceeds a given number, the improvement comprising the steps of:

(e) sensing at least one engine characteristic selected from the group consisting of engine noise and engine vibration;

(f) measuring said at least one engine characteristic of the engine and comparing said at least one engine characteristic to at least one corresponding pre-determined threshold level of said engine characteristic for distinguishing between engine activation and engine non-activation, said engine non-activation including engine turn-off;

(g) performing at least one 'AND' logic operation on a first signal corresponding to said at least one engine characteristic and on a delayed second signal corresponding to the incremental count; and (h) upon completing a particular said 'AND' logic operation, actuating the alarm unit for providing an additional warning signal following said engine turn-off.

12. The method of claim 11, wherein the step of measuring said at least one engine characteristic is performed as a function of time selected from the group consisting of a continuous function of time and a discontinuous function of time.

13. The method of claim 11, further comprising the step of measuring ambient temperature in a vicinity of the engine, whereby said engine characteristic level varies in relation to said ambient temperature.

14. The method of claim 11, wherein said particular 'AND' logic operation performed by said logic circuit for said actuating the alarm unit for providing said additional warning signal following said engine turn-off is fulfilled by said logic circuit receiving said first signal from said at least one engine characteristic level tester registering said engine characteristic less than said pre-determined threshold level corresponding to said engine turn-off, and receiving said delayed second signal from the counter registering the incremental count of occasions exceeding the given number on which the voltage is less than the given level at the end of the given time interval.

15. The method of claim 11, wherein said additional warning signal is at least one said signal selected from the group consisting of an audio signal, a visual signal, and an electromagnetic signal.

16. An improved method for warning of deterioration of a starter mechanism in which a motor is powered by a battery to start a combustion engine, featuring the steps of (a) sensing activation of the starter mechanism, (b) when a given time interval has elapsed since the activation, measuring a voltage across the battery, and (c) providing a warning signal when the voltage is below a given level, the improvement comprising the steps of:

(d) sensing at least one engine characteristic selected from the group consisting of engine noise and engine vibration;

(e) measuring said at least one engine characteristic of the engine and comparing said at least one engine characteristic to at least one corresponding pre-determined threshold level of said engine characteristic for distinguishing between engine activation and engine non-activation, said engine non-activation including engine turn-off;

(f) performing at least one 'AND' logic operation on a first signal corresponding to said at least one engine characteristic and on a delayed second signal sent from the timer at the end of the given time interval corresponding to the voltage being below the given level; and (g) upon completing a particular said 'AND' logic operation, actuating the alarm unit for providing an additional warning signal following said engine turn-off.

17. The method of claim 16, wherein the step of measuring said at least one engine characteristic is performed as a function of time selected from the group consisting of a continuous function of time and a discontinuous function of time.

18. The method of claim 16, further comprising the step of measuring ambient temperature in a vicinity of the engine, whereby said engine characteristic level varies in relation to said ambient temperature.

19. The method of claim 16, wherein said particular 'AND' logic operation performed by said logic circuit for said actuating the alarm unit for providing said additional warning signal following said engine turn-off is fulfilled by said logic circuit receiving said first signal from said at least one engine characteristic level tester registering said engine characteristic less than said pre-determined threshold level corresponding to said engine turn-off, and receiving said delayed second signal from said latch circuit registering the voltage less than the given level at the end of the given time interval.

20. The method of claim 16, wherein said additional warning signal is at least one said signal selected from the group consisting of an audio signal, a visual signal, and an electromagnetic signal.

* * * * *